US012559662B2

(12) United States Patent (10) Patent No.: US 12,559,662 B2
Meade et al. (45) Date of Patent: Feb. 24, 2026

(54) GEOPOLYMER COMPOSITIONS AND METHODS

(71) Applicant: Schlumberger Technology Corporation, Sugar Land, TX (US)

(72) Inventors: Mark Meade, Katy, TX (US); Andrey Vladimirovich Yakovlev, Houston, TX (US); Anatoly Vladimirovich Medvedev, Cambridge (GB); Nathan Fischer, Sugar Land, TX (US); Christopher Parton, Rosenberg, TX (US); Veronica Richter McDonald, Sugar Land, TX (US); Yeukayi Nenjerama, Sugar Land, TX (US); Randy Tercero, La Porte, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/726,862

(22) PCT Filed: Feb. 6, 2023

(86) PCT No.: PCT/US2023/062050
§ 371 (c)(1),
(2) Date: Jul. 5, 2024

(87) PCT Pub. No.: WO2024/006588
PCT Pub. Date: Jan. 4, 2024

(65) Prior Publication Data
US 2025/0171677 A1 May 29, 2025

Related U.S. Application Data

(60) Provisional application No. 63/367,095, filed on Jun. 27, 2022.

(51) Int. Cl.
| | |
|---|---|
| *C09K 8/46* | (2006.01) |
| *C04B 12/00* | (2006.01) |
| *C04B 24/16* | (2006.01) |
| *C04B 28/00* | (2006.01) |
| *C04B 103/20* | (2006.01) |
| *C04B 103/44* | (2006.01) |
| *C04B 103/46* | (2006.01) |
| *C04B 111/00* | (2006.01) |
| *E21B 33/13* | (2006.01) |

(52) U.S. Cl.
CPC .............. *C09K 8/46* (2013.01); *C04B 12/005* (2013.01); *C04B 24/168* (2013.01); *C04B 28/006* (2013.01); *C04B 2103/20* (2013.01); *C04B 2103/44* (2013.01); *C04B 2103/46* (2013.01); *C04B 2111/00146* (2013.01); *E21B 33/13* (2013.01)

(58) Field of Classification Search
CPC ....... C09K 8/46; C04B 12/005; C04B 24/168; C04B 28/006; C04B 2103/20; C04B 2103/44; C04B 2103/46; C04B 2111/00146; E21B 33/13
See application file for complete search history.

(56) References Cited

U.S. PATENT DOCUMENTS

| | | | |
|---|---|---|---|
| 4,509,985 | A | 4/1985 | Davidovits |
| 4,859,367 | A | 8/1989 | Davidovits |
| 5,349,118 | A | 9/1994 | Davidovits |
| 5,356,579 | A | 10/1994 | Jennings |
| 5,539,140 | A | 7/1996 | Davidovits |
| 5,626,665 | A | 5/1997 | Barger |
| 5,635,292 | A | 6/1997 | Jennings |
| 5,637,412 | A | 6/1997 | Jennings |
| 5,788,762 | A | 8/1998 | Barger |
| 7,794,537 | B2 | 9/2010 | Barlet-Gouedard |
| 2008/0028994 | A1* | 2/2008 | Barlet-Gouedard ......................... C04B 28/006 106/790 |
| 2012/0260594 | A1 | 10/2012 | Blackstock |
| 2012/0260829 | A1* | 10/2012 | Pershikova ............ C09K 8/487 106/804 |
| 2016/0137551 | A1 | 5/2016 | Le Gouil |
| 2020/0231503 | A1* | 7/2020 | Dubey ................ C04B 40/0608 |
| 2021/0253932 | A1 | 8/2021 | Pisklak |
| 2023/0128657 | A1 | 4/2023 | Pisklak |

FOREIGN PATENT DOCUMENTS

| | | |
|---|---|---|
| EP | 3020692 A1 | 5/2016 |
| JP | 2015518462 A | 7/2015 |
| JP | 2017202963 A | 11/2017 |
| KR | 1020170022743 A | 3/2017 |
| WO | 2005019130 A1 | 3/2005 |
| WO | 2018210418 A1 | 11/2018 |

(Continued)

OTHER PUBLICATIONS

Luukkonen, T. et al., "One-part alkali-activated materials: A review", Cement and Concrete Research, 2018, 103, pp. 21-34.
Alrefaei, Y. et al., "Effect of superplasticizers on properties of one-part Ca(OH)2/Na2SO4 activated geopolymer pastes", Construction and Building Materials, 2020, 241, 14 pages.
Zhou, S. et al., "One-part alkali activated slag using Ca(OH)2 and Na2CO3 instead of NaOH as activator: more excellent compressive strength and microstructure", Materials Research Express, 2021, 8, 8 pages.

(Continued)

*Primary Examiner* — Crystal J Lee
(74) *Attorney, Agent, or Firm* — Jeffrey D. Frantz

(57) ABSTRACT

Geopolymeric compositions are presented that are useful as geopolymer slurries for cementing subterranean wells. The slurries may contain an aluminosilicate source, an alkaline source, and a carrier fluid. The slurries generate an alkali metal or alkaline earth hydroxide activator in situ, thereby avoiding or reducing handling of alkali materials at a wellsite.

19 Claims, No Drawings

(56) References Cited

FOREIGN PATENT DOCUMENTS

| WO | 2020092754 A1 | 5/2020 |
| WO | 2023032791 A1 | 3/2023 |
| WO | 2024006282 A1 | 1/2024 |

OTHER PUBLICATIONS

Alhamdan, A., "Shrinkage Behaviour of One and Two Part Alkali-Activated Mortars: Factors and Mitigation Techniques", Thesis, Concordia University, 2018, 203 pages.

Liew Yun Ming, et al., "Characteristic of One-Part Geopolymer as Building Materials" Chapter10 in Sustainable Waste Utilization in Bricks, Concrete, and Cementitious Materials, Characteristics, Properties, Performance, and Applications, 2021, Lecture Notes in Civil Engineering, Springer, 31 pages.

International Search Report and Written Opinion of the PCT Application No. PCT/US2023/026349 dated Oct. 20, 2023, 8 pages.

International Search Report and Written Opinion of the PCT Application No. PCT/US2023/062050 dated Jun. 6, 2023, 7 pages.

Wong, V. et al., "Long-Term Strength Evolution in Ambient-Cured Solid-Activator Geopolymer Compositions", Minerals 2021, 11, 22 pages.

Bernal, S. A. et al., "Alkali-activated slag cements produced with a blended sodium carbonate/sodium silicate activator", Advances in Cement Research, paper 150013, 2015, 12 pages.

Neupane, K. et al., "Sodium hydroxide-free geopolymer binder for prestressed concrete applications", Construction and Building Materials, 2021, 293, 19 pages.

Davidovits, J., "Synthesis of New High-Temperature Geo-Polymers for Reinforced Plastics/Composites" Society of Plastics Engineers, presented at the Fourth Annual Pacific Technical Conference and Technical Displays, PACTEC, Jan. 31-Feb. 2, 1979, 6 pages.

* cited by examiner

GEOPOLYMER COMPOSITIONS AND METHODS

CROSS-REFERENCE TO RELATED APPLICATIONS

This application is a National Stage Entry of International Application No. PCT/US2023/062050, filed Feb. 6, 2023, which claims priority to and the benefit of U.S. Provisional Patent Application Ser. No. 63/367,095, filed Jun. 27, 2022, which is entirely incorporated herein by reference.

BACKGROUND

The statements in this section merely provide background information related to the present disclosure and may not constitute prior art.

The present disclosure broadly relates to well cementing. More particularly the invention relates to the use of geopolymers, to geopolymer slurry compositions and the related methods of placing the geopolymer composition in a well using conventional or unconventional cementing techniques.

Geopolymers are a novel class of materials that are formed by chemical dissolution and subsequent recondensation of various aluminosilicate oxides and silicates to form an amorphous three-dimensional framework structure. Therefore, a geopolymer is a three-dimensional aluminosilicate mineral polymer. The term geopolymer was proposed and first used by J. Davidovits (Synthesis of new high-temperature geo-polymers for reinforced plastics/composites, SPE PACTEC' 79, *Society of Plastics Engineers*) in 1976 at the IUPAC International Symposium on Macromolecules held in Stockholm.

Geopolymers based on alumino-silicates are designated as poly(sialate), which is an abbreviation for poly(silicon-oxo-aluminate) or $(-Si-O-Al-O-)_n$ (with n being the degree of polymerization). The sialate network comprises $SiO_4$ and $AlO_4$ tetrahedra linked alternately by sharing all the oxygens, with $Al^{3+}$ and $Si^{4+}$ in IV-fold coordination with oxygen. Positive ions ($Na^+$, $K^+$, $Li^+$, $Ca^{2+}$ . . . ) may be present in the framework cavities to balance the negative charge of $Al^{3+}$ in IV-fold coordination.

The empirical formula of polysialates is: $M_n \{-(SiO_2)_z-AlO_2\}_n$, w $H_2O$, wherein M is a cation such as potassium, sodium or calcium, n is a degree of polymerization and z is the Si/Al atomic ratio that may be 1, 2, 3 or more.

The three-dimensional (3D) geopolymers networks are summarized in Table 1.

radioactive waste streams. Geopolymers are also recognized as being rapid setting and hardening materials. They exhibit superior hardness and chemical stability.

Geopolymer compositions have been applied in the construction industry. In particular, U.S. Pat. No. 4,509,985 discloses a mineral polymer composition employed for fabricating cast or molded products at room temperature, or temperatures generally up to 120° C. U.S. Pat. Nos. 4,859,367, 5,349,118 and 5,539,140 disclose a geopolymer for solidifying and storing hazardous waste materials in order to provide the waste materials with a high stability over a very long time, comparable to certain archeological materials. U.S. Pat. Nos. 5,356,579, 5,788,762, 5,626,665, 5,635,292 5,637,412 and 5,788,762 disclose cementitious systems with enhanced compressive strengths or low density for construction applications. Patent application WO 2005019130 highlights the problem of controlling the setting time of a geopolymer system in the construction industry.

Geopolymer compositions comprise an aluminosilicate source, alkaline activator and a carrier fluid. The activator may be a hydroxide. A hydroxide may have high pH's, often exceeding 13. Consequently, preparation of such compositions may pose health, safety and environmental (HSE) risks. It may be advantageous to use preparation methods that do not involve handling such hydroxide compounds at the surface.

SUMMARY

The present disclosure provides well cementing compositions that comprise geopolymers and methods for employing them in well cementing operations.

In an aspect, embodiments relate to methods that comprise preparing a pumpable geopolymer slurry comprising an aluminosilicate source, an alkaline source and a carrier fluid. A portion of an alkali metal or alkaline earth metal hydroxide is generated in situ as a result of the chemical reaction. Some of the in situ reaction may take place in the subterranean well.

In a further aspect, embodiments relate to methods that comprise preparing a pumpable geopolymer slurry comprising an aluminosilicate source, a, an alkaline source and a carrier fluid. The geopolymer slurry is then placed in a subterranean well, during which a portion of an alkali metal or alkaline earth metal hydroxide is generated in situ. The geopolymer slurry then hardens and sets in the subterranean well to form a geopolymer.

Embodiments described herein provide a method, comprising preparing a pumpable geopolymer slurry comprising

TABLE 1

| Geopolymer chemical designations (wherein M is a cation such as K, Na or Ca, and n is a degree of polymerization). | | | |
|---|---|---|---|
| Si/Al ratio | Designation | Structure | Abbreviations |
| 1 | Poly(sialate) | $M_n(-Si-O-Al-O-)_n$ | (M)-PS |
| 2 | Poly(sialate-siloxo) | $M_n(-Si-O-Al-O-Si-O)_n$ | (M)-PSS |
| 3 | Poly(sialate-disiloxo) | $M_n(-Si-O-Al-O-Si-O-Si-O-)_n$ | (M)-PSDS |

The properties and application fields of geopolymers depend principally on their chemical structure, and more particularly on the Si/Al molar ratio. Geopolymers have been investigated for use in several applications, including as concrete systems within the construction industry, as refractory materials and as encapsulants for hazardous and an aluminosilicate source, an alkaline source and a carrier fluid, wherein the alkaline source generates an alkali metal hydroxide or alkaline earth metal hydroxide or both in situ.

Other embodiments described herein provide a method, comprising preparing a pumpable geopolymer slurry comprising an aluminosilicate source, a an alkaline source and a carrier fluid, wherein the alkaline source generates an alkali metal hydroxide or alkaline earth metal hydroxide in situ; placing the pumpable geopolymer slurry in a subterranean well; and setting the pumpable geopolymer slurry to form a geopolymer.

Other embodiments described herein provide a method, comprising preparing a pumpable geopolymer slurry comprising an aluminosilicate source, a, an alkaline source and a carrier fluid, wherein the alkaline source generates an alkali metal hydroxide or alkaline earth metal hydroxide or both in situ, and wherein the aluminosilicate source is a fly ash, a volcanic ash, a ground blast furnace slag, a calcined or partially calcined clay, an aluminum-containing silica fume, a natural aluminosilicate, a synthetic aluminosilicate glass powder, a zeolite, a scoria, an allophone, a bentonite, a red mud, a calcined red mud, a pumice, or a combination thereof.

DETAILED DESCRIPTION

In the following description, numerous details are set forth to provide an understanding of the present disclosure. However, it may be understood by those skilled in the art that the methods of the present disclosure may be practiced without these details and that numerous variations or modifications from the described embodiments may be possible.

At the outset, it should be noted that in the development of any such actual embodiment, numerous implementation—specific decisions are made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the disclosure and this detailed description, each numerical value should be read once as modified by the term "about" (unless already expressly so modified), and then read again as not so modified unless otherwise indicated in context. The term about should be understood as any amount or range within 10% of the recited amount or range (for example, a range from about 1 to about 10 encompasses a range from 0.9 to 11). Also, in the summary and this detailed description, it should be understood that a concentration range listed or described as being useful, suitable, or the like, is intended that any concentration within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, even if specific data points within the range, or even no data points within the range, are explicitly identified or refer to a few specific, it is to be understood that inventors appreciate and understand that any data points within the range are to be considered to have been specified, and that inventors possessed knowledge of the entire range and the points within the range.

As used herein, "embodiments" refers to non-limiting examples disclosed herein, whether claimed or not, which may be employed or present alone or in any combination or permutation with one or more other embodiments. Each embodiment disclosed herein should be regarded both as an added feature to be used with one or more other embodiments, as well as an alternative to be used separately or in lieu of one or more other embodiments. It should be understood that no limitation of the scope of the claimed subject matter is thereby intended, any alterations and further modifications in the illustrated embodiments, and any further applications of the principles of the application as illustrated therein as would normally occur to one skilled in the art to which the disclosure relates are contemplated herein.

The geopolymer formulations herein involve the use of an aluminosilicate source, a metal silicate and an alkaline source in a carrier fluid at near-ambient temperature. The carrier fluid may be aqueous, water or containing water, or as it has been said previously, all the four components do not need necessarily to be added separately; for example, the alkaline source can already be within water as a precursor solution. The aluminosilicate source can be in the form of a solid component; the metal silicate can be in the form of a solid or of an aqueous solution of metal silicate; the alkaline source can be in the form of a solid or of an aqueous solution. Alkaline source or portion of the alkaline source can be added to water or can be mixed with the aluminosilicate source first and then added to water as a blend. In the methods described herein, the alkaline source generates an alkali metal or alkaline earth metal hydroxide in situ to activate polymerization of the geopolymer.

Formation of the set geopolymer uses an aluminosilicate source, which may include (but are not limited to) fly ashes such as ASTM type C fly ash ASTM type F fly ash, and fly ashes not classified by ASTM, volcanic ash, ground blast furnace slag, calcined or partially calcined clays (such as metakaolin), aluminum-containing silica fume, natural aluminosilicate, synthetic aluminosilicate glass powder, zeolite, scoria, allophone, bentonite, red mud, which may be calcined, and pumice. These materials contain a significant proportion of an amorphous aluminosilicate phase, which reacts in strong alkaline solutions. The more common aluminosilicates are fly ash, metakaolin and blast furnace slag. Mixtures of two or more aluminosilicate sources may also be used if desired. In addition, alumina and silica sources may be added separately, for example as a blend of bauxite and silica fume.

Formation of the set geopolymer also involves an alkali activator. The alkali activator may be an alkali metal hydroxide, an alkaline-earth metal hydroxide, or combinations thereof. Alkali metal hydroxides may be lithium, sodium or potassium hydroxide. Alkaline-earth metal hydroxides may include calcium, strontium or barium hydroxide. The metal hydroxides may be added as a solid, an aqueous mixture, or an encapsulated liquid or solid material In an encapsulated embodiment, the solid or liquid activator can be trapped in a capsule that will break when subjected to, for example, mechanical stress on the capsule, or coating degradation from temperature, radiation, and/or chemical exposure. The capsule can also naturally degrade if made from a biodegradable or self-destructive material. Furthermore, the alkali activator when in liquid state may be adsorbed into a porous material and may be released after a certain time or due to a predefined event. The alkali activator may be added to the composition at a concentration between about 1M to 10M or between 3M and 6M.

Formation of a geopolymer may also involve a metal silicate. The metal silicate may be an alkali metal silicate such as sodium silicate, sodium metasilicate or potassium silicate. Silicates of Li, Na, K, Rb, and Cs or their combination can be used. The metal silicate, such as sodium metasilicate, may be present at a concentration between 0.01 kg/L and 0.2 kg/L, or between 0.05 kg/L and 0.1 kg/L. The $SiO_2/Na_2O$ molar ratio may be less than or equal to 3.2. The $SiO_2/K_2O$ molar ratio may be less than or equal to or less than 3.2. The metal silicate may be present in the composition at a concentration between about 0.1M and 5M, or between 0.5M and 2M. The metal silicates may be dry blended with the aluminosilicate source. Also, the metal silicate in another embodiment may be encapsulated.

The methods presented herein are applicable to use in an oilfield, for example during completion of oil or gas wells. To be used in oilfield applications, a pumpable geopolymer slurry is formed where geopolymer reactants mixed with a carrier fluid. Various additives may be added to the slurry, and the slurry is then pumped into the wellbore. Pumpability may be defined, in some cases, as a slurry consistency lower than about 70 Bc (Bearden consistency units) as measured by a high-temperature, high-pressure consistometer. Also, in some cases, the yield value (Ty) for a pumpable slurry may be lower than about 60 lbf/100 ft². The slurry is then allowed to set and harden in the well.

Traditionally, a solution of the alkali activator (e.g., NaOH) is mixed with the aluminosilicate source and the metal silicate at the surface. Alkali metal hydroxides activate aluminosilicates to cause polymerization reactions that form geopolymers. Handling alkali solutions at the surface may pose health, safety and environmental (HSE) challenges. The methods described herein use techniques that do not require handling of caustic materials at the surface.

Disclosed herein are methods and reactions by which the alkali activators may be generated in situ from an alkaline source after addition to water or to a geopolymer slurry. In some cases, the alkaline source consists of a hydroxide source and an ionic material that can react with the hydroxide source to yield the alkali activator and a precipitate that is substantially insoluble in the carrier fluid. In other cases, the alkaline source, or a component thereof, reacts directly with water to produce the alkali activator. The alkaline source may comprise alkali earth metal hydroxide, such as $Ca(OH)_2$ or $Ba(OH)_2$, $Sr(OH)_2$. The alkaline source may comprise an alkali metal salt selected from the group consisting of carbonate $M_2CO_3$, sulphate, $M_2SO_4$, phosphate $M_3PO_4$, oxalate $M_2C_2O_4$, silicate $M_2SiO_3$, fluoride MF, hexafluoridosilicate $M_2SiF_6$, iodate $MIO_3$, molybdate $M_2MoO_4$ and combinations thereof. Some reactions that generate alkali activator from an alkaline source follow.

$$Ca(OH)_2 + M_2CO_3 \rightarrow CaCO_3 + 2MOH.$$

$$Ca(OH)_2 + M_2SO_4 \rightarrow CaSO_4 + 2MOH.$$

$$3Ca(OH)_2 + 2M_3PO_4 \rightarrow Ca_3(PO_4)_2 + 6MOH.$$

$$Ca(OH)_2 + M_2C_2O_4 \rightarrow CaC_2O_4 + 2MOH.$$

$$Ca(OH)_2 + M_2SiO_3 \rightarrow CaSiO_4 + 2MOH.$$

$$Ca(OH)_2 + MF \rightarrow CaF_2 + 2MOH$$

$$3Ca(OH)_2 + M_2SiF_6 \rightarrow 3CaF_2 + 2MOH + SiO_2 + 2H_2O.$$

$$Ca(OH)_2 + 2MIO_3 \rightarrow Ca(IO_3)_2 + 2MOH.$$

$$Ca(OH)_2 + M_2MoO_4 \rightarrow CaMoO_4 + 2MOH.$$

These reactions all generate alkali metal hydroxide ionic species in situ as alkali activators along with a precipitate that is substantially insoluble in the carrier fluid. M may be Na, K, Li, Rb, Cs and a combination of alkali metals can be used.

In another embodiment, the alkali activator generated in situ is calcium hydroxide, by the following reaction: $2(3CaO \cdot SiO_2) + 6H_2O \rightarrow 3CaO \cdot 2SiO_2 \cdot 3H_2O + 3Ca(OH)_2$.
Thus, in some embodiments, the alkaline source can be an alkaline earth metal oxide such as CaO, SrO or BaO, or combination thereof, that generates the alkali activator upon reaction with water. For example, dicalcium silicate or tricalcium silicate can be used. The hydroxide generated by the above reactions and materials can be an alkali activator on its own, raising pH of the slurry to a value that promotes polymerization. Alternately, $Ca(OH)_2$ may participate the reactions above to generate an alkali metal hydroxide, MOH, while precipitating insoluble calcium salt. Portland cement may be a source of tricalcium silicate. Thus, Portland cement can be used to provide an alkaline source for in situ generation of alkali activator for geopolymer slurries.

Alkali metal hydroxide may also be generated in situ by a combination of alkali metal salt and an aluminosilicate comprising lime or hydrated lime, for example Type C fly ash, blast furnace slag or both. Thus, in such cases, the alkaline source for generating alkali activator in situ can be an aluminosilicate material comprising lime or hydrated lime combined with an alkali metal salt. That is, the alkaline source and all or part of the aluminosilicate source for the geopolymer slurry can be provided by one raw material.

The alkaline source materials described above can be encapsulated to generate hydroxide upon release of the encapsulated materials during or after placement in a subterranean location. The encapsulated material can include any or all of the alkali metal salts described above, to wit an alkali metal salt selected from the group consisting of $M_2CO_3$, $M_2SO_4$, $M_3PO_4$, $M_2C_2O_4$, $M_2SiO_3$, MF, $M_2SiF_6$, $MIO_3$, and $M_2MoO_4$, wherein M is Li, Na, K, Rb, or Cs; and alkaline earth metal oxides and hydroxides. Mixtures of such materials can be encapsulated together in a single precursor system. The encapsulant prevents contact with water until the reactants are released, at which time reaction begins to form the alkali activator or activators.

Thickening time of the geopolymer slurries described herein can be further influenced by adding retarders and accelerators. Several retarders may delay the setting and hardening of geopolymer slurries. Retarders such as sodium pentaborate decahydrate, borax, boric acid, lignosulphonates, sodium glucoheptonate, tartaric acid, citric acid, sucrose, or phosphorus containing compounds such as phosphoric acid, salts thereof, or mixtures thereof can be included in the geopolymer slurry in amounts up to about 1 part per hundred by weight of the total geopolymer slurry. The amount of retardation of the polymerization reaction, and the setting of the slurry, depends on the type of raw materials used for the slurry and the type and relative quantity of retarding reagent used. Adding too much retarder reagent to a geopolymer slurry can cause the slurry to remain unhardened by interfering with the polymerization reaction so the geopolymer slurry does not set.

Accelerators such as lithium salts, for example lithium chloride, lithium hydroxide, or a mixture thereof, can be included in the geopolymer slurry in amounts up to about 0.5 parts per hundred weight of the total slurry. The amount of acceleration of the polymerization reaction, and the setting of the slurry, depends on the type of raw materials used for the slurry and the type and relative quantity of accelerating reagent used. Adding too much accelerator to a geopolymer slurry can cause the slurry to thicken too quickly making it difficult to deploy the slurry to target locations downhole.

Further control or delay of hydroxide generation in the geopolymer slurry may be accomplished by encapsulating the reactants. The reactants may be released inside the wellbore during placement as the encapsulating material dissolves or degrades. Or, the surface area of the reactants, applied mixing energy or temperature may be varied to affect the rate at which the reactants interact.

Furthermore, because the reactants described above may be in solid form, it may be possible to dry blend the reactants with the aluminosilicate source or other solid ingredients such as metal silicate. Such a scenario may simplify preparation of a geopolymer slurry at the wellsite.

Geopolymer slurries for use in well lining applications typically have a slurry density range from 0.84 g/cm$^3$[7 lbm/gal] to 2.87 g/cm$^3$ [24 lbm/gal]. The slurry density can be influenced by quantity of water added and/or by adding density modifiers. Density modifiers can include density increasing particles and density lowering particles. Low-density particles may be included in the geopolymer slurry to achieve lower slurry densities for a given amount of water added, or heavy particles may be added to achieve higher slurry densities. The lightweight particles may have densities lower than 2 g/cm$^3$, or lower than 1.3 g/cm$^3$. Examples include hollow glass or ceramic microspheres (cenospheres), plastic particles such as polypropylene beads, rubber particles, uintaite (sold as GILSONITE™), vitrified shale, petroleum coke or coal or combinations thereof. The lightweight particles may be present in the geopolymer slurry at concentrations between about 0.06 kg/L and 0.6 kg/L (20 lb/bbl and 200 lb/bbl). The particle size range of the low-density particles may be between about 38 μm and 3350 μm (6 mesh and 400 mesh). The heavy particles typically may have densities exceeding 2 g/cm$^3$, or more than 3 g/cm$^3$. Examples include hematite, barite, ilmenite, silica (e.g. crystalline silica sand), crushed granite and also manganese tetroxide commercially available under the trade names of MicroMax™ and MicroMax FF™.

Other additives, such as antifoam agents, defoamers, silica, fluid-loss control additives, viscosifiers, dispersants, expanding agents, anti-settling additives or combinations thereof. Selection of the type and amount of additive largely depends on the desired nature and properties of the geopolymer, and those of ordinary skill in the art will understand how to select a suitable type and amount of additive for compositions herein.

The fluid-loss control agent may include a latex material. The latex may be an alkali-swellable latex. The latex may be present in the geopolymer slurry at a concentration between 0.02 L/L and 0.3 L/L (1 gal/bbl and 15 gal/bbl), or between 0.05 L/L and 0.15 L/L.

Viscosifiers may comprise a polysaccharide. Diutan gum having a molecular weight higher than about $1\times10^6$ can be used. The diutan gum may be present in the geopolymer slurry at a concentration between 0.14 g/L and 1.4 g/L (0.05 lbm/bbl and 0.5 lbm/bbl). Other viscosifiers may comprise polysaccharide biopolymers such as welan gum, a polyanionic cellulose (PAC), a carboxymethylcellulose (CMC), or a combination thereof present at a concentration between 0.14 g/L and 1.4 g/L (0.05 lbm/bbl and 0.5 lbm/bbl). The molecular weight of the polysaccharides, which may be biopolymers, may be between 100,000 and 1,000,000.

Carboxylic acids including gluconic acid, glucoheptonic acid, tartaric acid, citric acid, glycolic acid, lactic acid, formic acid, acetic acid, propionic acid, oxalic acid, malonic acid, succinic acid, adipic acid, malic acid, nicotinic acid, benzoic acid and ethylenediamine tetraacetic acid (EDTA), may be included in the geopolymer slurry as retarders or dispersants or both. Phosphoric acids may be present for the same purpose. Soluble salts of these acids may also be employed. The acids and salts can be used in any combination, and may be present in the geopolymer slurry at total concentrations between 0.5 g/L and 10 g/L, or between 1 g/L and 5 g/L.

Expanding agents may comprise calcium sulfate hemihydrate, metal oxides such as MgO or combinations thereof. The expanding agents may be present in the geopolymer slurry at concentrations between 0.01 kg/L and 0.2 kg/L of slurry, or between 0.05 and 0.1 kg/L.

The preceding description has been presented with reference to present embodiments. Persons skilled in the art and technology to which this disclosure pertains will appreciate that alterations and changes in the described structures and methods of operation can be practiced without meaningfully departing from the principle, and scope of this present disclosure. Accordingly, the foregoing description should not be read as pertaining only to the precise structures described and shown in the accompanying drawings, but rather should be read as consistent with and as support for the following claims, which are to have their fullest and fairest scope.

The invention claimed is:

1. A method, comprising:
preparing a pumpable geopolymer slurry comprising an aluminosilicate source, an alkaline source, and a carrier fluid, wherein the alkaline source is encapsulated by an encapsulant and comprises at least one of:
(i) a mixture of an alkaline earth metal hydroxide and an alkali metal salt, wherein the alkali metal salt is selected from a group consisting of: $M_2CO_3$, $M_2SO_4$, $M_3PO_4$, $M_2C_2O_4$, $M_2SiO_3$, MF, $M_2SiF_6$, $MIO_3$, $M_2MoO_4$, and any combination thereof, and wherein Mis Li, Na, K, Rb, or Cs; or
(ii) an alkaline earth metal oxide, a calcium silicate, or a combination thereof;
placing the pumpable geopolymer slurry in a subterranean well; and
releasing the alkaline source from the encapsulant in the subterranean well, whereby the released alkaline source generates an alkali metal hydroxide, an alkaline earth metal hydroxide, or both via an in situ reaction.

2. The method of claim 1, wherein the alkaline source comprises the mixture of the alkaline earth metal hydroxide and the alkali metal salt, wherein the alkaline earth metal hydroxide and the alkali metal salt react with one another via the in situ reaction.

3. The method of claim 1, wherein the alkaline source comprises dicalcium silicate, tricalcium silicate, calcium oxide, strontium oxide, barium oxide, or any combination thereof, and wherein the released alkaline source reacts with the carrier fluid via the in situ reaction.

4. The method of claim 1, wherein the alkaline source and at least a portion of the aluminosilicate source are provided by one raw material.

5. The method of claim 1, wherein the pumpable geopolymer slurry further comprises one or more retarders, accelerators, density modifiers, antifoam agents, defoamers, silica, fluid-loss control additives, viscosifiers, dispersants, expanding agents, anti-settling additives, or any combination thereof.

6. The method of claim 1, wherein the pumpable geopolymer slurry further comprises a retarder, wherein the retarder comprises sodium pentaborate decahydrate, borax, boric acid, lignosulphonates, sodium glucoheptonate, sucrose, tartaric acid, citric acid, a phosphorus containing compound, a salt thereof, or a mixture of any thereof.

7. The method of claim 1, wherein the pumpable geopolymer slurry further comprises a density modifier, wherein the density modifier comprises cenospheres, plastic particles, rubber particles, uintaite, vitrified shale, petroleum coke, coal, hematite, barite, ilmenite, silica, crushed granite, manganese tetroxide, or any combination thereof.

8. The method of claim 1, wherein the pumpable geopolymer slurry further comprises a fluid-loss control additive and a viscosifier, wherein the fluid-loss control additive comprises a latex material, and wherein the viscosifier comprises a polysaccharide.

9. The method of claim 1, wherein the pumpable geopolymer slurry further comprises a metal silicate.

10. The method of claim 1, wherein:

the alkaline source is released via at least one of dissolution of the encapsulant in the subterranean well or degradation of the encapsulant in the subterranean well;

the carrier fluid comprises water, and wherein the encapsulant prevents contact between the alkaline source and the water until the alkaline source is released from the encapsulant; and the method further comprises activating polymerization of the aluminosilicate source via the alkali metal hydroxide, the alkaline earth metal hydroxide, or both to form a geopolymer in the subterranean well after releasing the alkaline source.

11. The method of claim 1, wherein:

the aluminosilicate source comprises a fly ash, a metakaolin, a blast furnace slag, or a combination thereof;

the alkaline source is present in the pumpable geopolymer slurry at a concentration between about 1M and about 10M;

the pumpable geopolymer slurry further comprises sodium metasilicate present in the pumpable geopolymer slurry at a concentration between about 0.1M and about 5M;

the pumpable geopolymer slurry further comprises a density modifier present in the pumpable geopolymer slurry at a concentration between about 0.06 kg/L and about 0.6 kg/L;

the pumpable geopolymer slurry further comprises a latex material present in the pumpable geopolymer slurry at a concentration between about 0.02 L/L and about 0.3 L/L;

the pumpable geopolymer slurry further comprises a polysaccharide present in the pumpable geopolymer slurry at a concentration between 0.14 g/L and about 1.4 g/L;

the pumpable geopolymer slurry further comprises a carboxylic acid or a salt thereof, a phosphoric acid or a salt thereof, or any combination thereof, wherein a total concentration of the carboxylic acid or the salt thereof and the phosphoric acid or the salt thereof present in the pumpable geopolymer slurry is between 0.5 g/L and about 10 g/L; and the pumpable geopolymer slurry further comprises an expanding agent present in the pumpable geopolymer slurry at a concentration between about 0.01 kg/L and about 0.2 kg/L.

12. A method, comprising:

preparing a pumpable geopolymer slurry comprising an aluminosilicate source, an alkaline precursor system, and a carrier fluid, wherein the alkaline precursor system is encapsulated by an encapsulant and configured to generate an alkali metal hydroxide, an alkaline earth metal hydroxide, or both via an in situ reaction when released from the encapsulant;

placing the pumpable geopolymer slurry in a subterranean well;

releasing the alkaline precursor system from the encapsulant in the subterranean well, whereby the released alkaline precursor system generates the alkali metal hydroxide, the alkaline earth metal hydroxide, or both via the in situ reaction; and setting the pumpable geopolymer slurry to form a geopolymer.

13. The method of claim 12, wherein the alkaline precursor system comprises an alkaline earth metal hydroxide and one or more alkali metal salts selected from a group consisting of $M_2CO_3$, $M_2SO_4$, $M_3PO_4$, $M_2C_2O_4$, $M_2SiO_3$, MF, $M_2SiF_6$, $MIO_3$, $M_2MoO_4$, and any combination thereof, wherein M is Li, Na, K, Rb, or Cs, and wherein the alkaline earth metal hydroxide and the one or more alkali metal salts react with one another via the in situ reaction.

14. The method of claim 12, wherein the alkaline precursor system comprises dicalcium silicate, tricalcium silicate, calcium oxide, strontium oxide, barium oxide, or any combination thereof, and wherein the released alkaline source reacts with the carrier fluid via the in situ reaction.

15. The method of claim 12, wherein the alkaline precursor system and at least a portion of the aluminosilicate source are provided by one raw material.

16. A method, comprising:

preparing a pumpable geopolymer slurry comprising an aluminosilicate source, an alkaline source, and a carrier fluid, wherein the alkaline source is encapsulated by an encapsulant, and wherein the aluminosilicate source comprises a fly ash, a volcanic ash, a ground blast furnace slag, a calcined or partially calcined clay, an aluminum-containing silica fume, a natural aluminosilicate, a synthetic aluminosilicate glass powder, a zeolite, a scoria, an allophone, a bentonite, a red mud, a calcined red mud, a pumice, or any combination thereof;

placing the pumpable geopolymer slurry in a subterranean well;

releasing the alkaline source from the encapsulant in the subterranean well; and generating an alkali metal hydroxide, an alkaline earth metal hydroxide, or both in the subterranean well via an in situ reaction of the released alkaline source in the subterranean well.

17. The method of claim 16, wherein the alkaline source comprises an alkaline earth metal hydroxide and one or more alkali metal salts selected from a group consisting of $M_2CO_3$, $M_2SO_4$, $M_3PO_4$, $M_2C_2O_4$, $M_2SiO_3$, MF, $M_2SiF_6$, $MIO_3$, $M_2MoO_4$, and any combination thereof, wherein M is Li, Na, K, Rb, or Cs, and wherein the alkaline earth metal hydroxide and the one or more alkali metal salts react with one another in the subterranean well via the in situ reaction.

18. The method of claim 16, wherein the alkaline source comprises dicalcium silicate, tricalcium silicate, calcium oxide, strontium oxide, barium oxide, or any combination thereof, and wherein the released alkaline source reacts with the carrier fluid in the subterranean well via the in situ reaction.

19. The method of claim 16, wherein the alkaline source and at least a portion of the aluminosilicate source are provided by one raw material.

* * * * *